US005149071A

United States Patent [19]

Oliveira

[11] Patent Number: 5,149,071

[45] Date of Patent: Sep. 22, 1992

[54] DOUBLE-JAW VICE FOR HOLDING WORKPIECES

[76] Inventor: Paul L. Oliveira, 517 Anuhea Place, Volcano, Hi. 96785

[21] Appl. No.: 787,263

[22] Filed: Nov. 4, 1991

[51] Int. Cl.⁵ ............................................ B23Q 3/06

[52] U.S. Cl. .................................... 269/43; 269/152; 269/251; 269/287; 269/902; 269/271

[58] Field of Search ................. 269/902, 43, 152, 287, 269/288, 76, 251, 268, 80, 82, 277, 271; 51/216 R, 217 R

[56] References Cited

U.S. PATENT DOCUMENTS

| | | | |
|---|---|---|---|
| 3,768,797 | 10/1973 | Kartasuk et al. . | |
| 4,153,239 | 5/1979 | La Rocco | 169/902 |
| 4,284,267 | 8/1981 | Marben . | |
| 4,327,902 | 5/1982 | Holmes | 269/902 |
| 4,363,475 | 12/1982 | McCarty . | |
| 4,436,385 | 3/1984 | Fisher et al. | 269/902 |
| 4,437,654 | 3/1984 | Chiappetti . | |
| 4,583,432 | 4/1986 | Bricker | 269/902 |
| 5,005,813 | 9/1991 | Lawrence | 269/902 |

*Primary Examiner*—Robert C. Watson

*Attorney, Agent, or Firm*—Milton S. Gerstein

[57] ABSTRACT

A vice has a pair of parallel, work-piece clamping jaw-members, which jaw-members are spaced laterally apart. The first jaw-member is a semi-rigid one, while the second jaw-member is completely slidable as an integral unit, and also allows for the two jaw-elements thereof of which it is comprised to be movable toward and away from each, whereby the second jaw-member may be used separately to hold a workpiece, and may be used in conjunction with the first jaw-member for assisting the first jaw-member in firmly and safely clamping a workpiece in order to provide a more stable holding of the workpiece during the working thereof. The second, floating jaw-member may be adjusted for holding the smaller-diameter portion of a long workpiece, while the fixed jaw-member holds and clamps the larger diameter portion of the same workpiece. The second workpiece may be used alone for holding and clamping workpieces that are more difficult to grip, or the like, and also may be used for holding a tool, or similar article, while the first, semi-rigid jaw-member clamps a workpiece associated with the tool being clamped by the floating jaw-member.

16 Claims, 3 Drawing Sheets

FIG 1
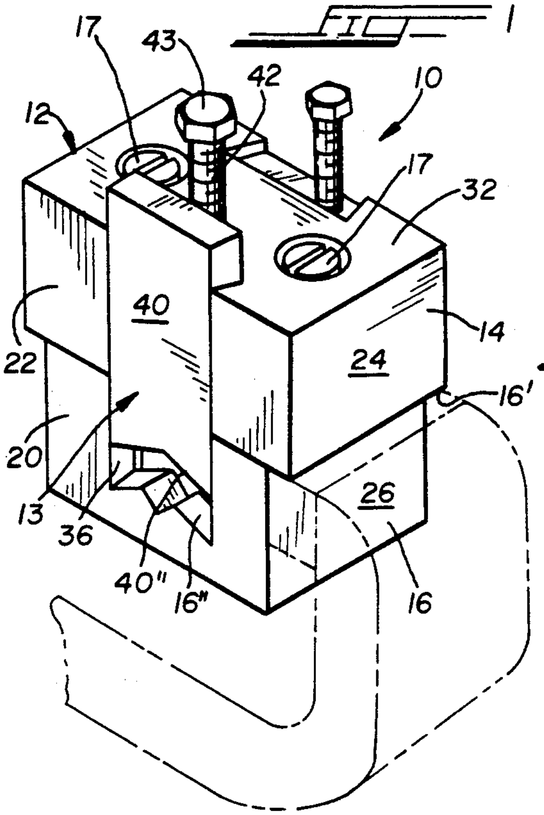
FIG 4
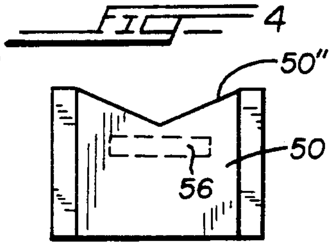
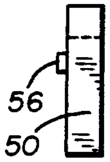
FIG 5
FIG 6
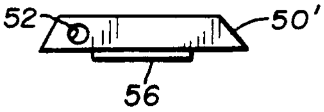
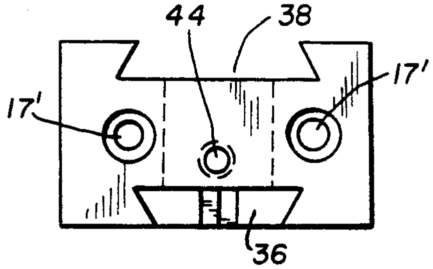
FIG 2
FIG 8
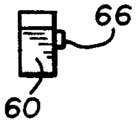
FIG 7
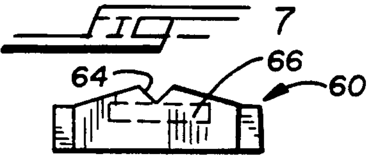
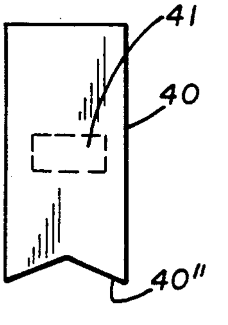
FIG 3
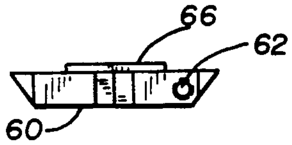
FIG 9

FIG. 11
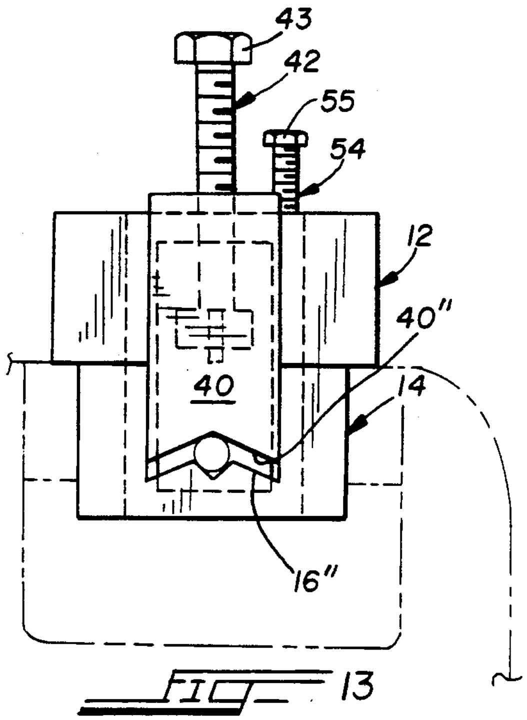
FIG. 12
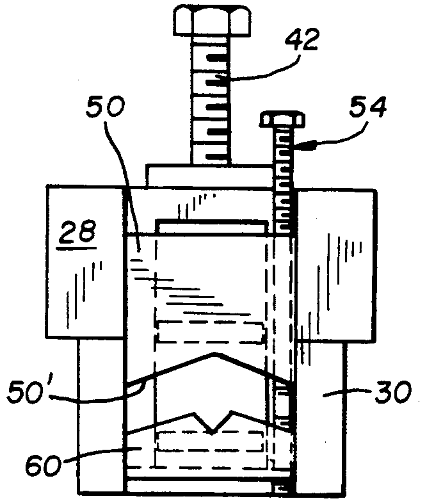
FIG. 13
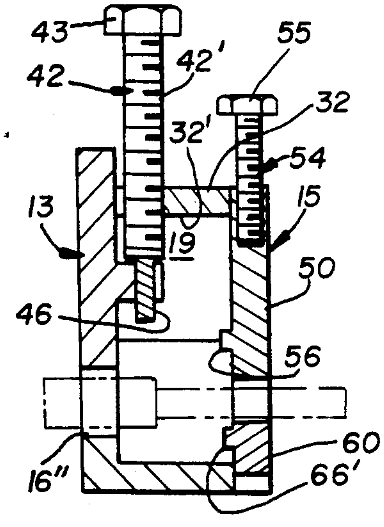
FIG. 14
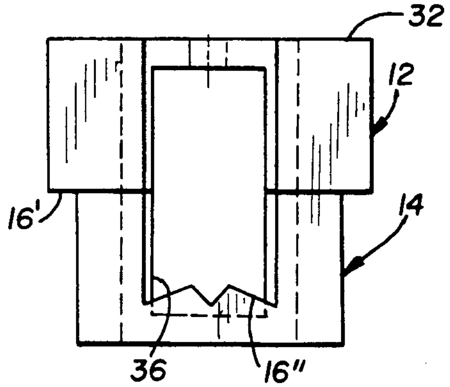
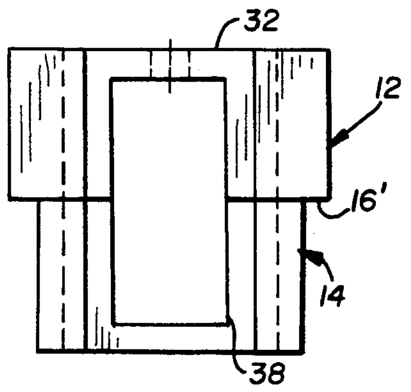
FIG. 15
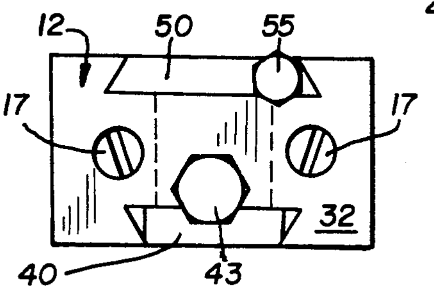
FIG. 16
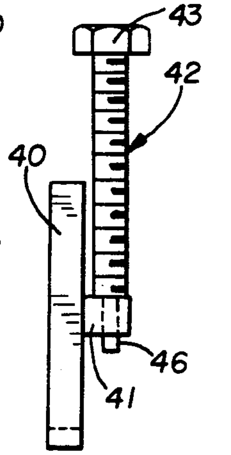
FIG. 17

DOUBLE-JAW VICE FOR HOLDING WORKPIECES

BACKGROUND OF THE INVENTION

The present invention is directed to a device for holding and clamping workpieces, such as bolts, bolt-heads, screws, screw-heads, hex-head bolts, socket-head bolts, button-head bolts, 12-point head bolts, hose-end fittings, tubing of any shape, spark plugs and a host of other mechanical parts, tools, and accessories, so that the workpiece may be worked on. Conventional vices provide one clamping jaw-piece for holding workpieces, which does not provide much flexibility, nor, for certain workpieces, a stable, firm grip thereon while the piece is worked on. The present invention overcomes these disadvantages, and provides a flexible vice that holds the workpiece in a much more stable and safe manner.

SUMMARY OF THE INVENTION

It is the primary objective of the present invention to provide a vice for clamping and holding workpieces that provides a great degree of flexibility while increasing the stability and retention of the workpiece while being worked.

It is a primary objective of the present invention to provide a vice that may be used by itself, or itself be held in a fixed, conventional vice for adapting the fixed vice in order to have the benefits of the vice of the invention.

Toward these and other ends, the vice of the present invention has a pair of parallel, work-piece clamping jaw-members, which jaw-members are spaced laterally apart. The first jaw-member is a semi-rigid one, and has a lower, fixed, V-shaped jaw-element and an upper, slidable jaw-element. The second jaw-member is completely slidable as an integral unit, and also allows for the two jaw-elements thereof of which it is comprised to be movable toward and away from each, whereby the second jaw-member may be used separately to hold a workpiece, and may be used in conjunction with the first jaw-member for assisting the first jaw-member in firmly and safely clamping a workpiece in order to provide a more stable holding of the workpiece during the working thereof. For example, the second, floating jaw-member may be adjusted for holding the smaller-diameter portion of a long workpiece, while the fixed jaw-member holds and clamps the larger diameter portion of the same workpiece. The second workpiece may be used alone for holding and clamping workpieces that are more difficult to grip, or the like, and also may be used for holding a tool, or similar article, while the first, semi-rigid jaw-member clamps a workpiece associated with the tool being clamped by the floating jaw-member. For example, the semi-rigid jaw-member may grip a screw, while the floating one holds a matching screwdriver inserted into the slot of the screw, whereby the tool can assist in manipulating, orienting, holding and/or stabilizing the screw while it is being held by the first semi-rigid jaw-member. The frame of the vice of the invention also provides a stepped, annular surface that assists in the holding of the vice of the invention in a conventional, fixed vice, if desired.

BRIEF DESCRIPTION OF THE DRAWINGS

The invention will be more readily understood with reference to the accompanying drawing, wherein:

FIG. 1 is an isometric view of the double-jaw vice of the invention;

FIG. 2 is a top, plan view of the frame of the vice of the invention, with the movable jaw-elements removed;

FIG. 3 is a front, elevation view of the upper, slidable jaw-element of the first, semi-fixed jaw-member;

FIG. 4 is a front, elevational view of the upper, slidable jaw-element of the second, floating jaw-member;

FIG. 5 is a side-elevational view thereof;

FIG. 6 is a top view thereof;

FIG. 7 is a a front, elevational view of the lower, slidable jaw-element of the second, floating jaw-member;

FIG. 8 is a side view thereof;

FIG. 9 is a top view thereof;

FIG. 11 is a front, elevational view of the vice of the invention with the first, semi-fixed jaw-member visible, with the vice being shown held in a conventional, table vice, shown in dotted lines;

FIG. 12 is a rear, elevational view of the vice of the invention with the second, floating jaw-member being visible;

FIG. 13 is a longitudinal, cross-sectional view through the vice;

FIG. 14 is a rear view of the main frame of the vice of the invention, with the movable jaw-elements removed;

FIG. 15 is a front view thereof;

FIG. 16 is a top view thereof with the movable elements inserted; and

FIG. 17 is a side, elevational view of the first, jaw-member.

DETAILED DESCRIPTION OF THE INVENTION

Figure 10:
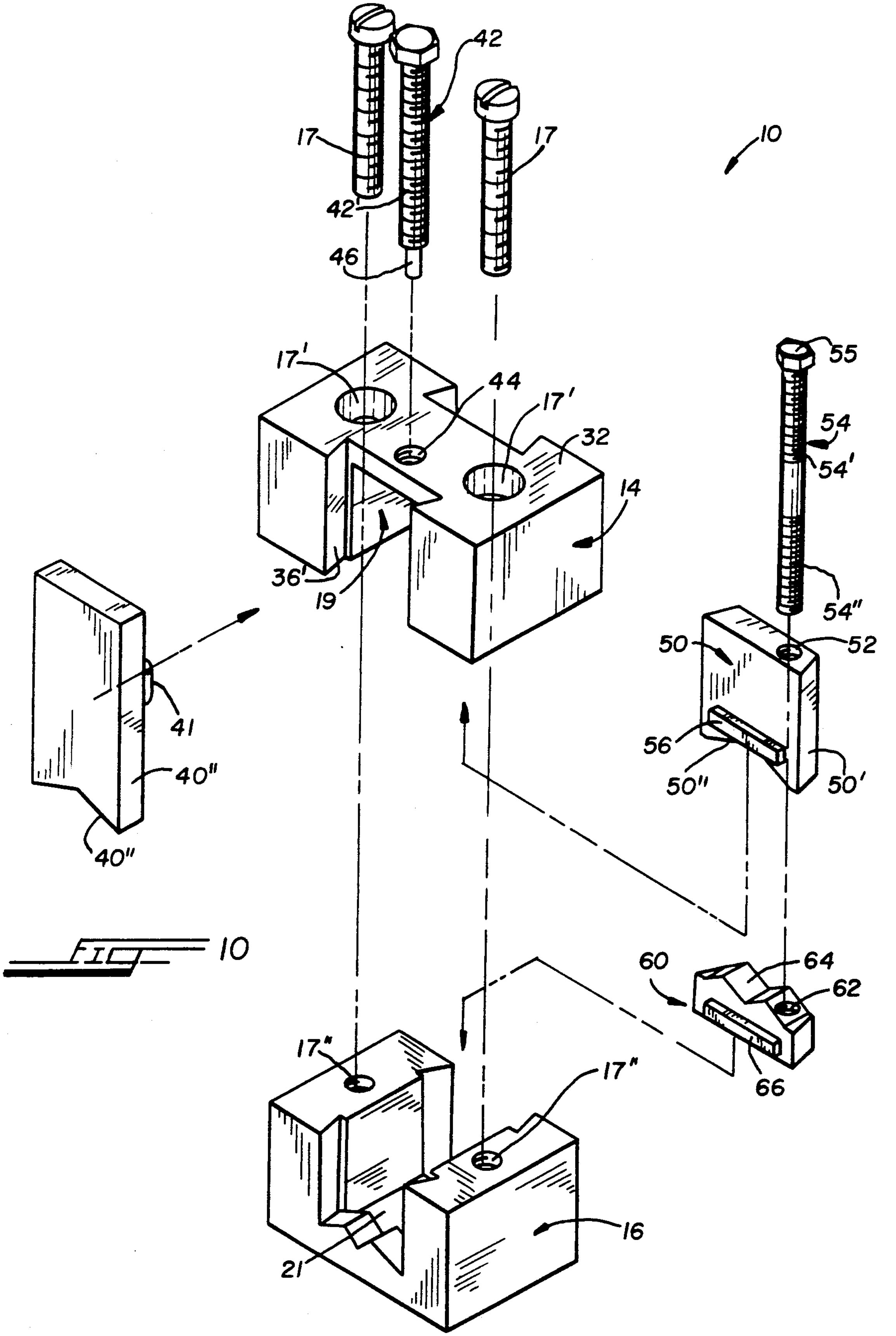
FIG. 10 is an assembly view, in perspective, showing the vice of the invention and the interconnections of the parts thereof.

Referring now to the drawings in greater detail, the vice of the invention is indicated generally by reference numeral 10. The vice 10 has a main frame 12 divided into a larger, upper section 14 and a smaller, lower section 16, whereby a stepped, or protruding, flat, annular surface 16' is provided, by which the vice 10 may be inserted into a conventional table-vice, with the annular surface 16' serving as a rest-stop as it lies upon the upper surface of a clamping jaw-element of a table-vice, as shown in dotted lines in FIGS. 1 and 11. Of course, the vice 10 of the invention may be used completely alone, without the aid of a table-vice, so that, in this respect, the vice 10 of the invention also serves as a portable and hand-held vice. The upper and lower sections 14, 16 are assembled together by a pair of bolts 17 (see FIG. 10) passing through aligned holes 17', 17'' formed in the upper and lower sections, respectively, with the lower holes 17'' being threaded and the upper holes 17' unthreaded. Of course, it is possible to make the frame and the upper and lower sections 14, 16 one integral from one block of alloy. The frame 12 defines a front made up of front surfaces 20, 22 of the upper and lower sections 14, 16, two sides made of side surfaces 24, 26 of the upper and lower section, a rear made up of the rear surfaces 28, 30 of the upper and lower sections, as best seen in FIG. 12, a top surface 32 and a bottom surface 34. The frame 12 has a front and rear, vertical, dovetail groove 36, 38 formed therein, in which are slidably received the movable jaw-elements of the front and rear jaw-members 13, 15, respectively, of the vice, as described below. The front dovetail groove 36 receives therein for sliding movement a movable jaw-element 40 of the front, semi-fixed jaw-member 13. The jaw-element 40 has angled side surfaces 40′ that mate with the angles side surfaces 36′ of the groove 36 so that the jaw-element is slidable in the groove, but retained therein. The lower section 16 has a toothed, or jagged-edge, clamping-jaw surface 16″ formed in the bottom of the front groove 36, as seen in FIGS. 1 and 10, which constitutes a fixed, lower clamping jaw-element of the front, clamping jaw-member 13 of the vice 10. The movable, slidable jaw-element 40 of the semi-fixed, front jaw-member 13 has a V-shaped, lower, clamping surface 40″, as seen in FIGS. 1, 3 and 10. The V-shaped surface 40″ cooperates with the lower, clamping surface 16″ for holding and clamping therebetween a workpiece, such as a screw, bolt, or whatever, in the manner of the jaws of a conventional tablevice. The V-shaped surface 40″ and the saw-toothed surface 16″ provide a much greater holding force to a workpiece, in order to provide greater stability. The rear of the slidable, jaw-element 40 is provided with an integral, rearwardly-projecting sleeve 41, as best seen in FIGS. 10, 13 and 17. A traversing screw 42 is threaded through a hole 44 (FIGS. 2 and 10) formed in the top surface 32 of the upper frame section 14. The lower end of the shank 42′ is provided with a narrower-diameter end-section 46 that is smooth and unthreaded for passage through a central opening formed in the sleeve 41 of the slidable jaw-element 40. The end-section 46 is retained in the sleeve 41 for relative rotation therein by any conventional means, such as a washer, or the like. Thus, as the traversing screw 42 is rotated in one direction or the other, the slidable jaw-element 40 is slid either up or down via the connection between the sleeve 41 and the end-section 46 of the screw 42, whereby differently-sized workpieces may be clamped and unclamped between opposing clamping surfaces 16″, 40″. The screw 42 also has an enlarged hex-head 43 by which it may be rotated by a hex-head wrench, or the like.

As described above, the rear dovetail-groove 38 receives therein the rear, floating jaw-member 15. The dovetail-groove 38, unlike the front dovetail-groove 36 with its lower surface 16″, extends entirely through the height of the frame 12, as seen in FIGS. 2, 12 and 13. The rear jaw-member 15 is made up of an upper clamping jaw-element 50, as best seen in FIGS. 4–6, 10 and 12. The upper jaw-element 50 is has planar front and rear surfaces, and angled side surfaces 50′ for mating with the canted side surfaces of the dovetail-groove 38. A threaded through-hole 52 is provided that passes entirely through the jaw-element 50 from the top surface thereof to the bottom surface thereof for receiving therethrough an upper section 54′ of a traversing screw 54. The hole 52 is located to one lateral side of the jaw-element 50, as best seen in FIG. 10, as to offer the least interference with the mating clamping surfaces of the floatable jaw-member 15 and with the workpiece, tool, or the like, clamped between the clamping surfaces of the floating jaw-member. An elongated, rectilinear-shaped stop member 56 is also provided on the front-facing surface of the jaw-element 50, which stop-member 56 prevents the upward removal of the upper jaw-element 50 from the dovetail-groove 38. The stop-member protrudes forwardly into the vacated, or hollow, space 19 formed in the frame 12 between the front dovetail-groove 36 and the rear dovetail-groove 38, whereby there is provided a continuous open volume which allows communication between the two dovetail-grooves. The stop-member prevents the upward removal of the upper jaw-element 50 by its projection into the hollow space 19 and its contact against the underside 32′ of the top surface 32, as best seen in FIG. 13. The bottom of the upper jaw-element 50 is provided with a V-shaped clamping surface 50″.

The floating, clamping jaw-member 15 has a lower jaw-element 60, best seen in FIGS. 7–10 and 12. The lower jaw-element, like the upper one, is also slidable, and has an offset, threaded through-hole 62 for receiving therethrough a lower section 54″ of the shank of the traversing screw 54. The lower, clamping jaw-element 60 also has an upwardly-facing, saw-toothed clamping surface 64 for cooperating with the V-shaped surface 50″ of the upper jaw-element. An elongated, rectilinear-shaped stop-member 66 is also provided, and projects forwardly from the forward, or front, surface of the jaw-element. The stop-member 66 prevents the lower jaw-element 60 from falling out of the dovetail-groove 38, by the abutment of the lower surface 66′ of the stop-member against the upper surface 21 of the bottom wall of the lower frame-section 16, as best seen in FIG. 13.

The lower section 54″ of the traversing screw 54 has threads in the opposite sense as to the threads of section 54′, so that, as the screw 54 is rotated via head 55 thereof, the upper and lower jaw-elements 50, 60 will be slid toward or away from each other, depending upon the direction of rotation, thereby clamping or unclamping a workpiece, tool, or the like, between the cooperating clamping surfaces 50″, 64. Of course, cooperation between the walls of the dovetail-groove 38 and the side walls of the clamping jaw-elements 50, 60 prevent rotation of the two clamping jaw-elements, so that rotation of the screw 54 is converted to the translation of the jaw-elements 50, 60.

In assembling the rear jaw-member 15 in the rear dovetail-groove 38, and before the upper and lower frame sections 14, 16 are assembled together, one first assembles the upper and lower jaw-sections together via the traversing screw 54, and then slides down the combined lower jaw-element 60 and upper jaw-element 50 from the top opening of the portion of the groove 38 in the lower frame-section 16 until the stop-member 66 abuts against the surface 21 of the bottom wall thereof. Thereafter, one then assembles the upper and lower frame-sections 14 and 16 together via the bolts 17, ensuring that the portion of the groove 38 in the upper frame-section 14 is slid over an upper part of the jaw-element 50 projecting upwardly beyond the lower section 16. The thus-formed vice may then be used so that either one of the two jaw-members is used for clamping a workpiece for work thereon. In addition, both jaw-members 13, 15 may be used simultaneously for working on the same workpiece. For example, as seen in FIG. 13, for a workpiece having two sections of different diametric extent, the larger section is gripped by the semi-fixed jaw-member 13, while the smaller section is gripped by the floating jaw-member 15, which floating jaw-member 15 readily accommodates the smaller diameter section by sliding the jaw-member 15 up or down in the dovetail-groove 38 to a level commensurate with the workpiece, after which the screw 55 is rotated to draw the jaw-sections 50 and 60 together to clamp the smaller section of the work-piece. Since the screw 54 is laterally offset to one side, it does not interfere with the clamping surfaces 50", 64 of the upper and lower jaw-elements, respectively. Even for workpieces of equal size throughout, the two jaw-members may be used for clamping it, since the two-stage clamping thereof will provide a more stable and surer grip thereof, which will allow for an easier, safer, and better working of the workpiece. The floatable jaw-member 15 may be also used for clamping a tool associated with a workpiece clamped at the front, semi-fixed jaw-member 13, so that the tool can also be used for stabilizing and manipulating the workpiece. An example of this would be a screw and an associated screw driver.

While a specific embodiment of the invention has been shown and described, it is to be understood that numerous changes and modifications may be made therein without departing from the scope, spirit and intent of the invention as set forth in the appended claims.

What I claim is:

1. A vice comprising:

a main frame having a front portion and a rear portion;

a first clamping jaw-member independently mounted in said front portion;

a second clamping jaw-member mounted in said rear portion, said second clamping jaw-member being mounted independently of said first clamping jaw-member, and separately mounted to said rear portion;

said main frame further comprising a hollow space, said first clamping jaw-member and said second clamping jaw-member being connected by said hollow space for cooperative relationship therebetween, whereby a long workpiece clamped at a first section thereof by said first jew-member may also be simultaneously clamped at a second section thereof by said second jaw-member.

2. The vice according to claim 1, wherein said front portion of said main frame comprises a groove, said main frame having a bottom portion a section of which constitutes the bottom of said groove; said first clamping jaw-member comprising a movable, clamping jaw-element mounted for sliding movement in said groove; said first jaw-element having an end-surface that cooperates with said bottom of said groove, whereby a workpiece is clamped between said end-surface and said bottom of said groove.

3. The vice according to claim 2, wherein said end-surface is V-shaped and said bottom of said groove is saw-tooth-shaped.

4. The vice according to claim 1, wherein said second clamping jaw-member comprises a floating jaw-member comprising a first, slidable jaw-element, and a second, slidable jaw-element, said first and second jaw-elements being slidable toward and away from each other; said rear portion comprising a groove in which are slidably mounted said first and second jaw-elements of said second clamping jaw-member.

5. The vice according to claim 4, wherein said first slidable jaw element comprises a first gripping end-surface, and said second slidable jaw-element comprises a second gripping end-surface; said end-surfaces facing each other and defining the clamping surfaces by which a piece is gripped and clamped.

6. The vice according to claim 1, wherein said main frame comprises a first, upper section and a second, lower section; said upper section having greater dimensions than said lower section; each of said upper and lower sections comprising annular, circumferential surface, said annular, circumferential surface of said upper section being greater than said annular, circumferential surface of said lower section in order to defined therebetween an annular, stepped surface for use in positioning the vice in a table vice, whereby said annular, stepped surface rests upon the upper surfaces of the table-vice jaws during the clamping therein, and whereby the jaws of the table-vice clamp the vice at said lower section, with said first and second jaw-members being free for use for clamping objects thereby.

7. The vice according to claim 1, wherein said front portion of said main frame comprises a first dove-tail groove, said main frame having a bottom portion a section of which constitutes the bottom of said first groove; said first clamping jaw-member comprising a first slidable, clamping jaw-element mounted for sliding movement in said groove; said first jaw-element having an end-surface that cooperates with said bottom of said groove, whereby a workpiece is clamped between said end-surface and said bottom of said groove; said second clamping jaw-member being a floating jaw-member and comprising a second, slidable jaw-element, and a third, slidable jaw-element, said second and third slidable jaw-elements being slidable toward and away from each other; said rear portion comprising a second dovetail-groove in which are slidably mounted said second and third jaw-elements of said second clamping jaw-member.

8. The vice according to claim 7, wherein said each of said first, second and third jaw-elements comprises canted side walls for matching the slope of the side walls of the respective said dovetail-groove.

9. The vice according to claim 7, wherein said second jaw-member comprises a traversing screw having a first section threaded in one sense, and a second section threaded in the opposite sense; each of said second and third jaw-elements comprising a threaded through-hole for receiving a respective one of said first and second sections of said screw, whereby said second and third jaw-elements are capable of sliding movement together as one unit in said second dovetail groove, and are also capable of sliding movement relative to each other for movement toward each other for clamping and away from each other for releasing.

10. The vice according to claim 2, wherein said movable jaw-element comprises a rearwardly-projecting sleeve having a through-hole; said first jaw-member further comprising a screw threaded in a hole of said main frame; said screw having a lower end rotatably mounted in said sleeve, whereby, upon rotation of said screw in either direction, said jaw-element is translated in one or the other directions.

11. A vice comprising:

a main frame having a front portion and a rear portion;

a first clamping jaw-member independently mounted in said front portion;

a second clamping jaw-member mounted in said rear portion, said second clamping jaw-member being mounted independently of said first clamping jaw-member, and separately mounted to said rear portion;

said second clamping jaw-member comprising a floating jaw-member comprising a first, slidable jaw-element, and a second, slidable jaw-element, said first and second jaw-elements being slidable toward and away from each other; said rear portion comprising a groove in which are slidably mounted said first and second jaw-elements of said second clamping jaw-member.

12. The vice according to claim 11, wherein said second jaw-member comprises a traversing screw having a first section threaded in one sense, and a second section threaded in the opposite sense; each of said first and second jaw-elements comprising a threaded through-hole for receiving a respective one of said first and second sections of said screw, whereby said first and second jaw-elements are capable of sliding movement together as one unit in said groove, and are also capable of sliding movement relative to each other for movement toward each other for clamping and away from each other for releasing.

13. The vice according to claim 11, wherein said front portion of said main frame comprises another groove substantially in alignment with said groove of said rear portion, said main frame having a bottom portion a section of which constitutes the bottom of said another groove; said fist clamping jaw-member comprising a movable, clamping jaw-element mounted for sliding movement in said another groove; said first jaw-element having an end-surface that cooperates with said bottom of said another groove, whereby a workpiece is clamped between said end-surface and said bottom of said groove.

14. The vice according to claim 11, wherein each of said first and second slidable jaw-elements comprises a stop-member for preventing the respective said jaw-element from escaping out of said groove.

15. The vice according to claim 14, wherein said main frame comprises an upper and lower section, and means for removably mounting said upper and lower sections together; said lower and upper sections comprising a respective groove-portion of said groove; said first and second jaw-elements being assembled in said lower frame section's groove-portion before said upper and lower sections are assembled together.

16. A vice comprising:

a main frame having a front portion and a rear portion;

a first clamping jaw-member independently mounted in said front portion;

a second clamping jaw-member mounted in said rear portion, said second clamping jaw-member being mounted independently of said first clamping jaw-member, and separately mounted to said rear portion;

said front portion of said main frame comprising a first dove-tail groove, said main frame having a bottom portion a section of which constitutes the bottom of said first groove; said first clamping jaw-member comprising a first slideable, clamping jaw-element mounted for sliding movement in said groove; said first jaw-element having an end-surface that cooperates with said bottom of said groove, whereby a workpiece is clamped between said end-surface and said bottom of said groove; said second clamping jaw-member comprising a second, slidable jaw-element; said rear portion comprising a second dovetail-groove in which is slidably mounted said second jaw-element.

* * * * *